United States Patent [19]
Guerri et al.

[11] Patent Number: 5,638,631
[45] Date of Patent: Jun. 17, 1997

[54] FISHING LURE

[75] Inventors: Elmer A. Guerri, West Terre Haute, Ind.; William Thomas Mann, Eufaula, Ala.

[73] Assignee: Fish World, Inc., Eufaula, Ala.

[21] Appl. No.: 601,376

[22] Filed: Feb. 14, 1996

Related U.S. Application Data

[63] Continuation of Ser. No. 315,234, Sep. 29, 1994, abandoned.

[51] Int. Cl.⁶ .................................................. A01K 85/00
[52] U.S. Cl. .................. 43/42.33; 43/42.32; 43/42.45
[58] Field of Search ........................ 43/42.32, 42.33, 43/42.45

[56] References Cited

U.S. PATENT DOCUMENTS

| | | | |
|---|---|---|---|
| 1,473,420 | 11/1923 | Doering | 43/42.32 |
| 2,847,791 | 8/1958 | Simmons | 43/42.26 |
| 2,938,293 | 5/1960 | Richardson | 43/42.32 |
| 3,494,065 | 2/1970 | Benttinen et al. | 43/42.33 |
| 3,763,588 | 10/1973 | Foster | 43/42.33 X |
| 4,155,192 | 5/1979 | Varaney | 43/42.32 |
| 4,662,100 | 5/1987 | Yarusso | 43/42.45 X |
| 4,803,793 | 2/1989 | Schellenberg, III | 43/42.33 |
| 5,245,782 | 9/1993 | Pahle | 43/42.32 |

*Primary Examiner*—Joseph J. Hail, III
*Assistant Examiner*—Jay A. Stelacone
*Attorney, Agent, or Firm*—Veal & Associates

[57] ABSTRACT

In a fishing lure, a polygonal body shape is employed to provide a set of complementary planar surfaces on which a photographic reproduction of a bait fish may be applied to provide a realistic lure without distortion of the photographic portion of the lure.

17 Claims, 2 Drawing Sheets

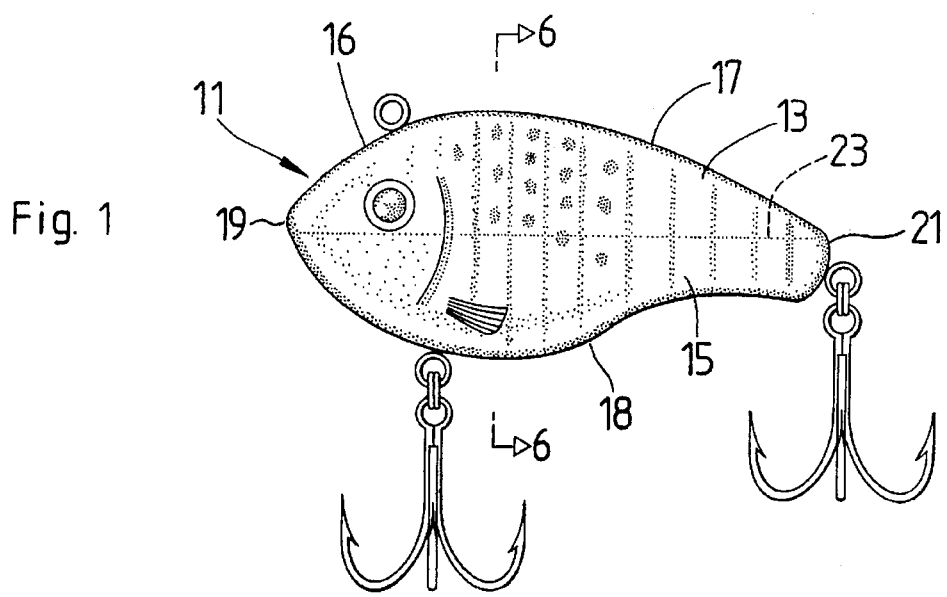
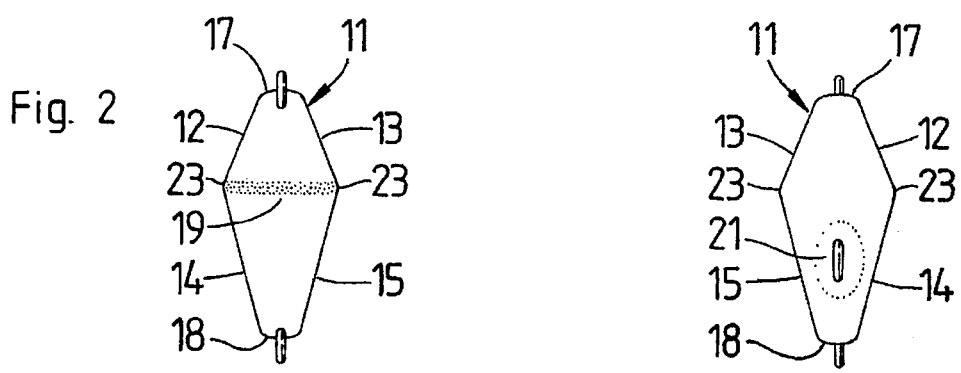
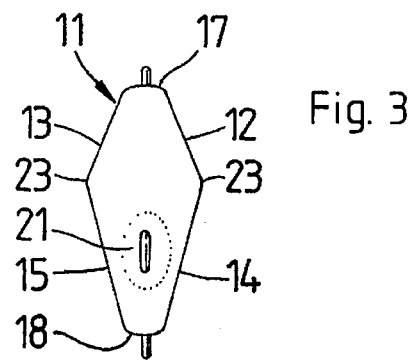
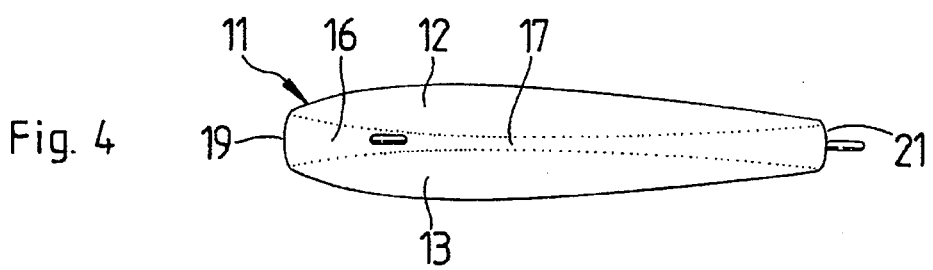
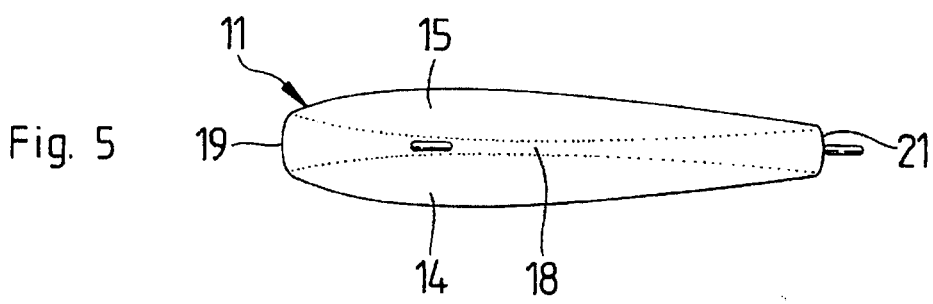

FISHING LURE

This application is a continuation of application Ser. No. 08/315,234, now abandoned.

FIELD OF THE INVENTION

The present invention relates to fishing lures and, more particularly, to fishing lures which emulate the appearance of a fish in the food chain of a game fish. That is to say, the present invention relates to fishing lures which look like bait fish due to the application of a photographic reproduction of a bait fish to the outer surface of the lure. In greater particularity, the present invention relates to the shape of the lure body which enables the accurate reproduction of the baitfish on the outer surface thereof.

BACKGROUND OF THE INVENTION

Fishing lures come in a variety of styles, shapes, colors and sizes. In each instance, the combination of features is intended to present a lure which fishermen believe will catch fish. One aspect of the presentation of such a lure is whether the lure looks like the natural food of the predatory game fish. Many prior attempts have been made to replicate the natural food chain; however, many more have apparently decided that such replication is not attainable and have instead resorted to artificial lures which only remotely resemble the natural food of the gamefish. Thus, one may find a variety of spoons and jigs which provide a flash of reflected light or a noisy retrieve through the water to get the gamefish attention. It is clear from the continuing development of new lures by fishermen that the prior art has not provided a product which is dominantly superior to other lures. This is so despite the use of photographs of fish in lures in the prior art, wherein the photograph is either affixed within the lure and visible through the sides of the lure, or affixed to the exterior of the lure.

In instances where the photograph is mounted within the lure, a true dimensional relationship is not provided between the plastic body and the photograph and at least the human eye can detect the artificial shell surrounding the photograph. The use of magnifying lenses in the plastic body has been attempted; however, such uses appear to be mere novelties which require perfect alignment of the viewer and the lenses to be effective. In instances where the photograph has been applied to the exterior of the lure, manufacturers have been limited in their attempts to apply a two dimensional photograph to a three dimensional body, thus creating distortions or omissions in the final lure produced. Therefore, the fishing lures known to us have been lacking in realism.

SUMMARY OF THE INVENTION

It is an object of the present invention to provide a fishing lure which is virtually identical in appearance to the fish in the food chain of the gamefish.

It is another object of the invention to present a fishing lure body which allows incorporation of a photographic reproduction of a fish in the food chain without significant distortion of the photograph.

These and other features and advantages of the invention are accomplished through the use of a novel body shape and the use of improved photographic presentation of the food fish as a part of the lure. Essentially, the present invention utilizes a dimensional body shape which permits the photographic reproduction of the food fish to be mounted thereto without distortion by providing a set of planar surfaces onto which the two dimensional photograph can be mounted. The planar surfaces which define each side of the lure intersect along a longitudinal line which is the locus of a single plane curve. The planar surfaces which define the top and bottom halves of the lure intersect along top or bottom portions which are appropriately pigmented to give a true representation of the dorsal and ventral appearance of the food fish. Thus, from a lateral view at any elevation, the lure appears as a natural fish.

BRIEF DESCRIPTION OF THE DRAWINGS

Apparatus embodying features of my invention are depicted in the appended drawings which form a portion of this disclosure and wherein:

FIG. 1 is a side elevational view of the lure;

FIG. 2 is a frontal view of the lure;

FIG. 3 is a rear view of the lure;

FIG. 4 is a top view of the lure;

FIG. 5 is a bottom view of the lure;

DESCRIPTION OF A PREFERRED EMBODIMENT

Figure 6:
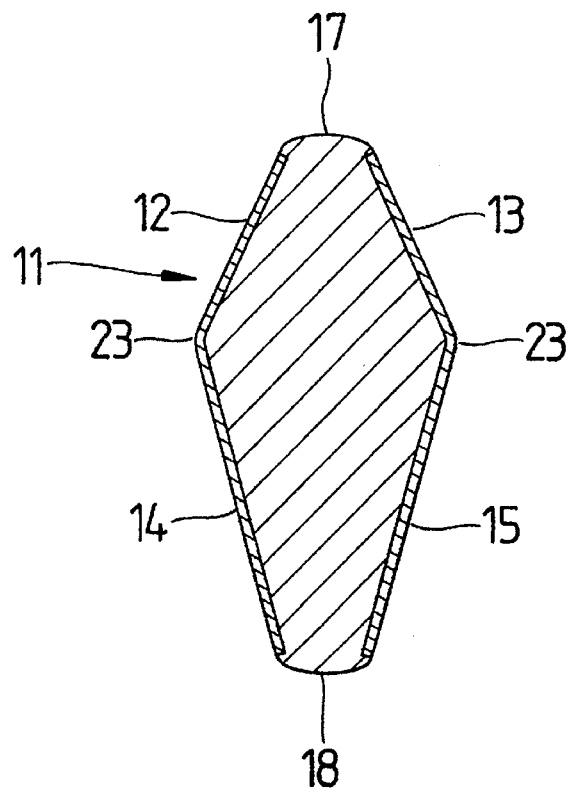
FIG. 6 is a sectional view taken along line 6—6 of FIG. 1 showing an alternate embodiment.

Referring to the drawings for a clearer understanding of the invention, it is to be understood that the present invention is an improvement in hard bodied fishing lures such as may be made from hard plastic, wood, composite materials, or hardened foam. Each of the aforesaid materials have characteristics which are beneficial and will affect the operation of the lure when it is retrieved; however, these characteristics are well known and their adaptation to the lure is not of patentable significance and will not be discussed at any length. Regardless of the material selected for the construction of the lure, each lure made in accordance with our invention is characterized by complimentary opposing planar surfaces.

In FIG. 1–5, the lure 11 is shown with planar surfaces 12, 13, 14 and 15, wherein planar surfaces 12 and 14 are formed on one side of the lure and surfaces 13 and 15 are formed on opposite sides of the lure. The lure has a top 17 and a bottom 18, as well as a forward portion 19 and a tail 21. It will be appreciated that the term complementary as used herein is intended to mean that the planar surfaces are such that a substantially symmetrical lure is formed when the surfaces are joined as defined herein. Of further significance is the joinder of planar surface 12 and 14 along a longitudinal of the lure 11. This intersection 23 is a single plane curve. That is to say, the curvature at the intersection is symmetric about only one orthogonal axis through the curve; thus, the planar surfaces 12 and 14 are in constant angular relationship. Accordingly, a photographic reproduction of a bait fish may be applied to the side of the lure and extend form the top to the bottom of the lure over surfaces 12 and 14 or 13 and 15 with minimal or no distortion. That is to say, the problem in placing a planar image on a curved surface is very much like making a planar image from a curved surface, in either situation the difference in surface area will create a distortion of the image. However, in our invention, the planar photographic reproduction is mounted on the planar surfaces; thus, no distortion occurs and the photographic reproduction does not need to be compressed or cut to make it fit on the lure.

Figure 7:
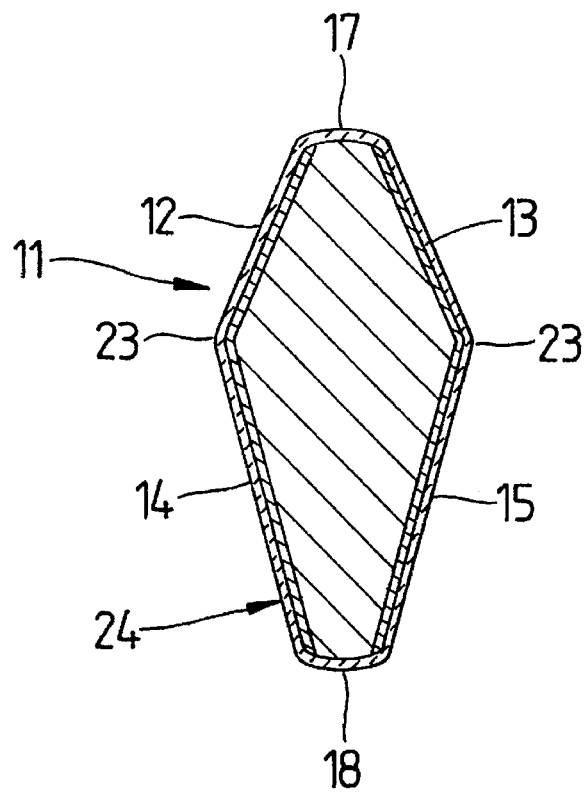
FIG. 7 is a sectional view showing a second alternate embodiment.

It will be appreciated that the lure in cross section has the appearance of a polygonal structure with the interstices of the complementary surfaces defined by the top, bottom, and single planar curves. The interstices defined at the single planar curves 23 are radiused as shown in FIGS. 6 and 7. The exterior of the lure is coated with an abrasion resistant lacquer or acrylic finish which protect the photographic reproduction and the top and bottom pigmentation which is added to blend the edges of the photograph into a natural color on the dorsal and ventral surfaces of the lure. Thus, a lure is presented which has the silhouette of the bait fish, the dorsal and ventral coloration of the baitfish and the exact lateral reproduction of the appearance of the bait fish in a realistic dimensional body. Of course, hooks, weights, and rattles may be added as are well known by lure manufacturers.

If the top and bottom portion of the lures are of an extreme width due to the single planar curve and size of the lure, then they should present a curved surface intermediate the complementary planar surfaces joined thereto. No distortion will be introduced in as much as these surfaces are pigmented or painted rather than overlaid by the photograph. Note also that the planar surfaces may be slightly recessed from the top and bottom as shown in FIG. 6. to provide additional protection to the photograph, and that the top portion may be substantially planar on the forward portion of the lure to provide a diving plane 16 to affect the retrieve characteristics of the lure.

In another embodiment shown in FIG. 7, our lure is made from a clear hard plastic body 24, which has the same configuration as described herein above, using planar inner surfaces connected by a single plane curve extending along the length of the lure. In this embodiment, the photo reproduction of the lure is affixed to the inside surface of the plastic body against the shell such that the planar inner surfaces allow mounting of the photo reproduction without any distortion of the bait depicted therein. As in the previous embodiment, the top and bottom portions are appropriately pigmented or painted to achieve an overall natural appearance of the bait.

While I have shown my invention in several forms, it will be obvious to those skilled in the art that it is not so limited but is susceptible of various changes and modifications without departing from the spirit thereof.

What is claimed is:

1. A fishing lure comprising a rigid outer body having the general silhouete of a fish including a defined top and bottom and front and rear, wherein said top and bottom and front and rear are connected by laterally symmetrical side portions, said side portions including a first planar section diverging from said bottom and a second planar section diverging from said top said first and second planar sections joined along a single plane curve formed longitudinally along said body, said single plane curve being rounded to give a more realistic appearance to said lure, and a planar photographic reproduction of a baitfish applied to said body on said planar sections and extending over said single plane curve without distortion of said planar photographic reproduction substantially from said front to said rear of said body.

2. A fishing lure as defined in claim 1, wherein said bottom and top are curvilinear intermediate said first planar section and said second said planar sections respectively.

3. A fishing lure as defined in claim 2, wherein said lure has, at any vertical transverse plane, a polygonal section having complementary sides, said sides not all being equal, and rounded interstices of said complementary sides.

4. A fishing lure as defined in claim 2, wherein said top and bottom are pigmented to provide dorsal and ventral coloration consistent with the appearance of the baitfish depicted in said photographic reproduction applied to said planar sections such that the overall appearance of the lure is that of a bait fish.

5. A fishing lure as defined in claim 1, wherein said top and bottom are pigmented to provide dorsal and ventral coloration consistent with said photographic reproduction applied to said planar sections such that the overall appearance of the lure is that of a bait fish.

6. A fishing lure as defined in claim 5, wherein said top has a substantially planar portion extending from said front of the lure rearwardly.

7. A fishing lure as defined in claim 5, wherein a transverse section of said lure along any vertical plane thereof is defined by a polygonal structure having complementary sides.

8. A fishing lure as defined in claim 1, wherein said photographic reproduction is overlain with a layer of a transparent abrasion resistant coating.

9. A fishing lure as defined in claim 8, wherein said top and bottom are in offset raised relation to said planar sections and said coating is applied over the entire lure to present a smooth overall outer finish.

10. A fishing lure having the general silhouette of a fish and defined along any transverse section by a substantially symetric polygon having at least four sides where the sides are not all equal, said polygon having planar faces defining upper and lower portions of the lure with said upper and lower portions intersecting along a single plane curve, said single plane curve being rounded to give a more realistic appearance to said lure, wherein said planar faces have a planar photographic reproduction of lateral portions of a fish's body applied thereto with said planar photographic reproduction vertically extending across said single plane curve without distortion to simulate the lateral appearance of a fish.

11. A fishing lure as defined in claim 10 further defined by a top and bottom of said lure which are pigmented to provide dorsal and ventral coloration consistent with said photographic reproduction applied to said planar faces such that the overall appearance of the lure is that of a bait fish.

12. A fishing lure as defined in claim 11, wherein said photographic reproduction is overlain with a layer of a transparent abrasion resistant coating.

13. A fishing lure as defined in claim 12, wherein said top and bottom are in offset raised relation to said planar faces and said coating is applied over the entire lure to present a smooth overall outer finish.

14. A fishing lure as defined in claim 12, wherein said top and bottom are rounded.

15. A fishing lure as defined in claim 12, wherein said top has a generally planar region intermediate opposing planar faces forming a forward portion of said lure.

16. A fishing lure as defined in claim 1 wherein said planar sections are formed internally of a transparent plastic shell.

17. A fishing lure comprising, in combination:
a) a planar photographic reproduction of a baitfish;
b) a rigid outer body having the general silhouette of a fish including a defined top and bottom and front and rear, wherein said top and bottom and front and rear are connected by laterally symmetrical side portions, said side portions including a first planar section diverging from said bottom and a second planar section diverging from said top said first and second planar sections intersecting along a single plane curve formed longitudinally along said body, said single plane curve being rounded to give a more realistic appearance to said lure, said planar photographic reproduction positioned on said lure to extend vertically from said first planar section over said single plane curve on to said second planar section without distortion of said planar photographic reproduction, said planar photographic reproduction covering only a portion of said first and second planar sections with the remainder of said laterally symmetrical side portions and said top, bottom front and rear having pigment applied thereto to form an anotomically true representation of the dorsal and ventral appearance of a baitfish.

* * * * *